United States Patent [19]
Rowland et al.

[11] 3,717,255
[45] Feb. 20, 1973

[54] LIQUID CLARIFICATION UNIT

[75] Inventors: Ronald P. Rowland, Springfield, Ohio; Donald P. Michel, Lake Oswego, Oreg.

[73] Assignee: The Bauer Bros. Co., Springfield, Ohio

[22] Filed: April 28, 1971

[21] Appl. No.: 138,093

Related U.S. Application Data

[63] Continuation of Ser. Nos. 791,382, Jan. 15, 1969, abandoned, and Ser. No. 4,695, Jan. 21, 1970, abandoned.

[52] U.S. Cl..................................210/512, 210/526
[51] Int. Cl. .............................................B01d 21/26
[58] Field of Search......................210/298, 512, 526

[56] References Cited

UNITED STATES PATENTS

| | | | |
|---|---|---|---|
| 3,433,361 | 3/1969 | Ades | 210/298 X |
| 3,456,798 | 7/1969 | Urdanoff | 210/298 X |

*Primary Examiner*—John Adee
*Attorney*—Jerome P. Bloom

[57] ABSTRACT

A liquid clarification unit comprising a single compartment receiving-settling type tank with means for a continuous discharge therefrom of settling solids combined with integrated means for the centrifugal separation of any remaining solids in the delivered liquid which do not settle, to provide thereby a substantially clarified liquid discharge which is distinct and separate from the discharge of the removed solids. The tank provides for a single common pool in the receptacle provided thereby, developed by a side feed of contaminated liquid in a relatively non-turbulent manner. This quickly spreads the inflow the length and width of the tank bottom and facilitates the quick and concurrent settling of contaminants which are continuously swept from the tank while suspended contaminants are cycled through integrated centrifugal cleaners to produce clarified liquids which discharge therefrom. The concentrated rejects issuing from the cleaners are returned directly to the same pool to quickly settle and discharge with the basic solids.

13 Claims, 3 Drawing Figures

PATENTED FEB 20 1973　　　　　　　　　　　　　　3,717,255
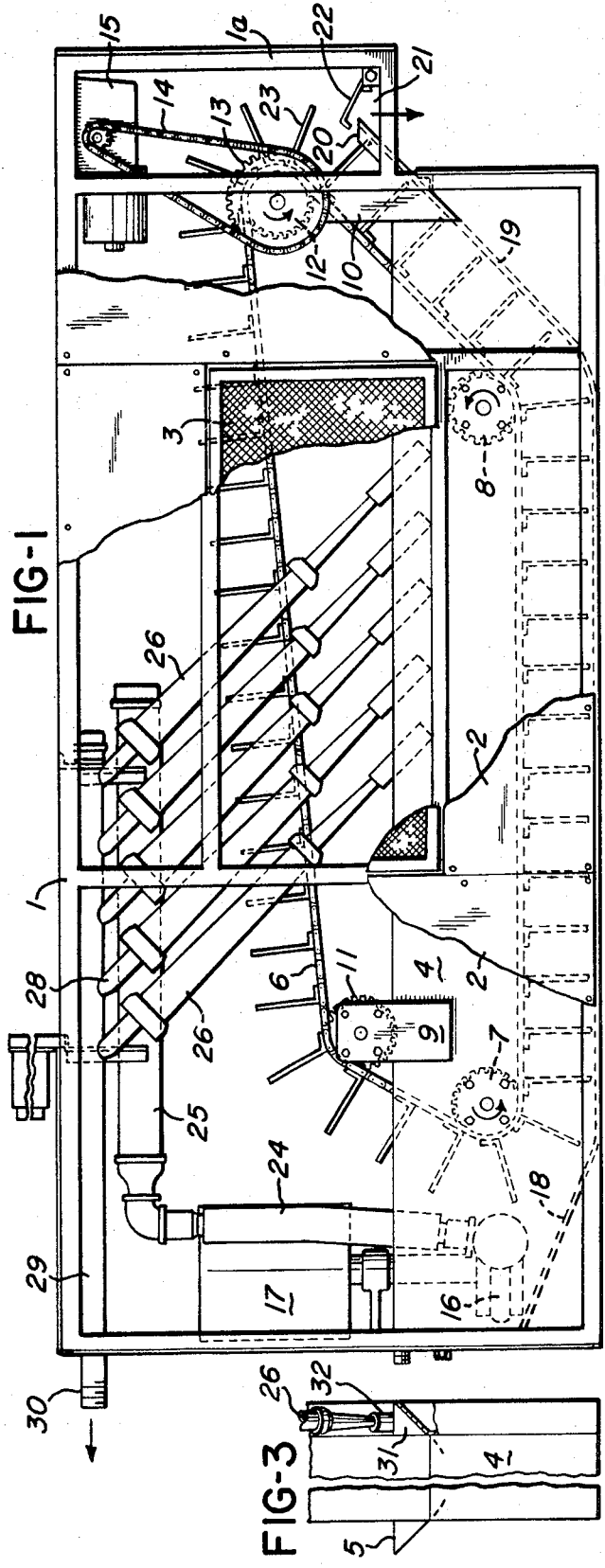
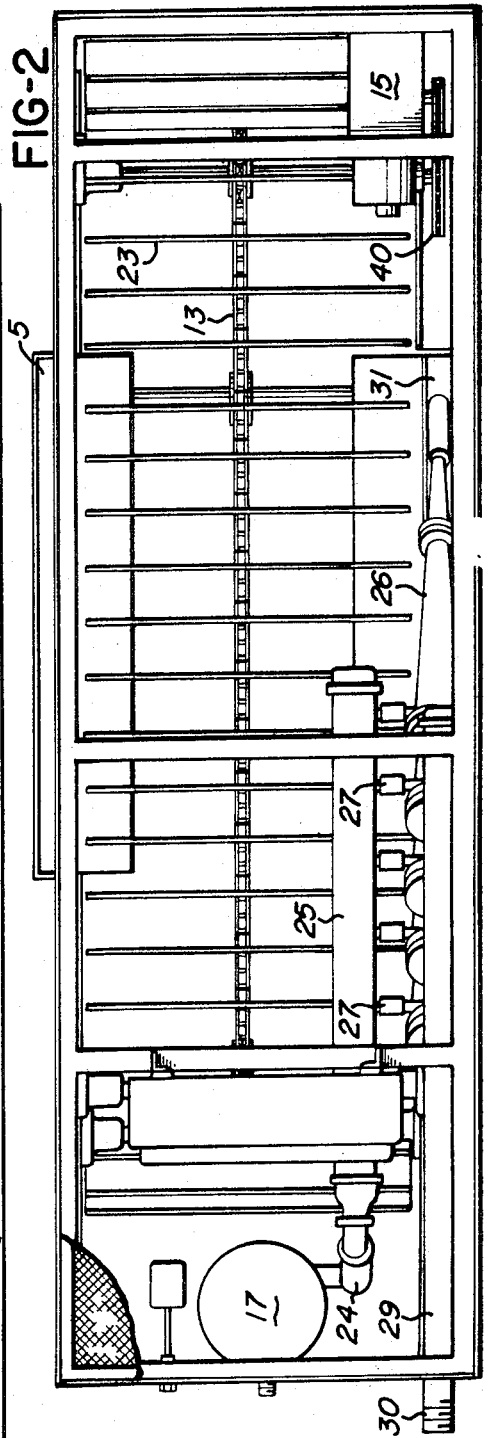
INVENTOR
RONALD P. ROWAND
DONALD P. MICHEL
BY Jerome P. Bloom
ATTORNEY

LIQUID CLARIFICATION UNIT

This application is a continuation of our previous applications Ser. No. 791,382, filed Jan. 15, 1969 and Ser. No. 4695, filed Jan. 21, 1970, both of which are now abandoned.

This invention relates to a process of clarifying contaminated liquids and to the simplified separation of liquids from solids. Though not so limited in application, by way of illustration it will be particularly described herein as pertaining to the clarification of coolants commonly used in connection with machine tool operations in the metal working industry. In such applications the invention process and apparatus is used for clarification and recovery of the liquid or coolant, the solid material which is removed therefrom being discharged as waste or salvagable material. The unit can, however, also be used for the recovery of the solid material with the liquid or coolant being discharged to waste or a reclamation system.

BACKGROUND

Liquid clarifiers have been in general use for quite some time, both for recovery of heavy fines and for the recovery of the liquid in a cleansed condition. Not only have such clarifiers been used on machine tool coolants but also for cleansing the flow of various liquids before discharge to waste to thereby alleviate or reduce stream pollution. In all such instances heretofore such equipment has required the incorporation of filters of various types, or collection boxes for the heavy material, or both. Also, invariably the structure employed has involved material handling tanks having plural compartments with means for moving materials in each compartment and from one to another for staged processing. The flow pattern and manner of feeding and processing the contaminated liquid in such structure has produced therein a low level of efficiency in respect to dollar cost of the installation and its operation. Particularly undesirable in the prior art units is that the manner of handling contaminated material has been such to induce turbulence interfering therein with fast and definitive settling of solids in the first instance, where settling tanks are employed. Moreover, such prior units have required considerable manual attention so that the filters can be cleaned or replaced and the collection boxes emptied at appropriate times. Such manual attention requires a shutdown of the units during the cleansing operations.

A PREFERRED EMBODIMENT OF THE INVENTION

The present clarifying unit is compact, economical and capable of continuous operation and cooperative function of all essential components with no shutdown for servicing or cleansing and requires practically no manual attention or supervision once it is installed.

In the preferred embodiment here illustrated the invention provides a single compartment open tank, free of partitions, having a feed trough along one side to provide for the infeed to said tank of contaminated liquid. This infeed is in such a manner as to quickly distribute the contaminants the length and width of the tank and in a manner to avoid turbulence, whereby to facilitate free and quick settling of heavy solids. Bridging the lateral extent of the tank are riffle plates mounted to a continuous chain, which plates are continuously moved the length of the tank bottom to pick up the solid contaminants in their path, particularly those in the process of quickly settling as they are fed into the tank. The contaminants are carried from the tank by movement thereof from its bottom and up an inclined extremity of said bottom for discharge. As each riffle plate moves past the discharge extremity of the tank bottom a downwardly angled extremity of a biased wiper arm pulls down over the projected edge of the plate to wipe it clean of contaminants and discharge the same. As all this is going on, at an end of the tank remote from contaminant discharge the tank embodies a pump the intake of which is elevated, though close to the tank bottom, which is drawing from the tank liquid containing light contaminants and those in the nature of fines which in individual form do not readily settle. Mounted in connection with the tank are centrifugal separating cleaners of conical shape which have their inlets at their head ends connected to receive, from the operation of the pump, the liquid contaminated with the lighter solids and fines. While there is a continuing infeed of contaminated liquid to the tank and a simultaneous continuing discharge of the heavier and larger contaminants by the riffle plates, the centrifugal cleaners operate purely by their internal conical configuration to separate contaminants in the liquid delivered from the pump and discharge them, inherently in more concentrated form, into the infeed to the tank. On the other hand these cleaners simultaneously discharge clarified liquid which is directed from the tank under pressure for further use.

Optionally, as will be obvious, the contaminants may be collected in discharge from the tank for salvage of valuable constituents, if such should exist. The whole process and system is one requiring simple structure wherein separation is sharp and distinct and there are no unnecessary handling procedures or apparatus.

The primary object of the invention is to simplify the construction as well as the means and mode of operation of liquid-solid separation units whereby such units may not only be more economically manufactured, but will be more efficient and satisfactory in use, adaptable to a wide variety of applications and unlikely to malfunction.

A further object of the invention is to provide a liquid clarification unit requiring little if any attention during operation.

Another object of the invention is to provide a liquid-solid separating unit in which the entering solid and liquid materials are continuously removed from the unit without operator attention.

An additional object of the invention is to provide a liquid clarification unit the nature and operation of which eliminates the need for periodic manual removal and cleansing of filter devices.

A further object is to provide, in a single tank clarification unit, means for separating light and fine solid materials from a contaminated liquid carrier and returning the same in concentrated form for removal from the carrier with an outgoing concentration of heavy solid materials.

A further object of the invention is to provide a self-contained clarification unit from which clarified liquid is returned to a collection reservoir or a place of use continuously and simultaneously with the discharge of contaminants, without the necessity of supplying additional power.

A further object of the invention is to provide an improved means and method to efficiently and economically separate solids from a liquid carrier regardless of whether or not the solids or the liquid carrier are to be recovered for future use characterized by the concept of the contaminated material being handled in a single pool which has minimal turbulence producing structure therein and in a form and manner to facilitate a natural, free and fast solids separation.

A further object of the invention is to provide a clarification unit possessing the advantageous structural features, the inherent meritorious characteristics and the mode of operation herein mentioned.

With the above and other incidental objects in view as will more fully appear in the specification the invention intended to be protected by Letters Patent consists of the features of construction, the parts and combinations thereof, and the mode of operation as hereinafter described or illustrated in the accompanying drawing, or their equivalents.

Referring to the accompanying drawing wherein is shown one but obviously not necessarily the only form of embodiment of the invention, FIG. 1 is a side view, generally diagrammatic, of a unit embodying the present invention;

FIG. 2 is a top view, generally diagrammatic, of the unit shown in FIG. 1; and

FIG. 3 is a fragmentary end view, generally diagrammatic, looking from the left of FIG. 1.

Like parts are indicated by similar characters of reference throughout the several views.

As shown in the accompanying drawing, the clarification unit is based in a frame 1 comprising a fabricated weldment of various structural steel shapes so as to provide support for the various functional units comprising the present clarifier. In practice the frame is enclosed within a skin or cover comprising a plurality of steel plates 2 and screens 3 to provide protection to the interior working parts of the clarifier. The enclosing members 2 and 3 are shown broken away over considerable area so as to disclose the interior construction of the clarifier unit.

Located in the bottom of the frame unit is a single tank or tray 4 which extends substantially the full length of the unit and also substantially the full transverse width of the unit. Note the interior of the tank is free of partitions or unnecessary flow obstructing wall elements. The liquid to be clarified is introduced to one side of this tray through the entrance hopper or trough 5 forming a feed inlet chute. The trough 5 projects outwardly from the side wall of the unit and extends, as seen in FIG. 2, a substantial proportion of the length of the tray. The dirt laden liquid is directed downwardly from the feed chute to sweep into the tray 4, from one side to the other and substantially the length thereof in a quick relatively non-turbulent smoothing manner to there form a single pool. Due to the manner of inflow, the heavier solid materials or "dirt" tends to quickly move through the liquid pool to the bottom of the tray.

Suitably mounted on the tray 4 is a continuous, loop formed, traveling conveyor 6, the lower run of which is supported on sprockets 7 and 8 mounted on shafts bridging and carried directly by the side walls of the tray. Projecting upwardly from the side walls are brackets 9 and 10 supporting shafts upon which sprockets 11 and 12 are mounted for supporting and guiding the upper run of the conveyor 6. The conveyor consists basically of a centrally disposed chain 13 which is transversely centered over tray 4, engaged with, and supported by, the sprockets 7, 8, 11 and 12. Fixed to project perpendicularly to and outwardly from the chain 13, at equidistantly spaced intervals, are riffle plates 23. Mounted concentrically with sprocket 12 but on the outboard end of the supporting shaft therefor is sprocket 40 to which power is supplied by motor 15 to drive the conveyor 6 through chain 14.

At one end of the tray 4 (left of FIG. 1) is located a pump 16 driven by an overhead motor 17. The floor of the tank is elevated slightly beneath the pump as at 18, to provide a sloped surface preventing collection of any solid material in this area of the tank which is adjacent to the pump intake. At its opposite end the floor of the tank 4 is inclined to a greater degree, as at 19, to provide a drainage area in which solid material is drained of the liquid as it is elevated thereover toward the discharge lip 20 on the tray 4.

The liquid level in the tank 4 may be maintained at any desired point above the intake of the pump 16, such level being controlled by a liquid level switch (not shown).

The heavy waste material introduced into the tank along with the liquid to be clarified tends to relatively freely move to the bottom of the tank and, as it does, it is picked up and advanced by the riffle plates on the endless traveling conveyor unit 6. As shown in FIG. 1 the conveyor plates 23 have their outermost ends projected directly to the bottom of the tray to insure that they pick up, positively move, and elevate the heavy material thereon up the incline 19, to and above the liquid level therein, to the discharge edge or lip 20 of the tray. Here the material is forced over the lip to fall outwardly and downwardly at 21 through the bottom of a frame extension 1a. From here the heavy solid material may be transported to waste or a reclamation center by a further traveling conveyor (not shown). Overlying the lip 20 of the tray 4 is a biased wiper arm 22.

As seen in FIG. 1, the base end of arm 22 is mounted substantially at a level with and beyond the lip 20 of tray 4 and the arm per se is angled to extend rearwardly, up and over the lip. At its uppermost end, the arm 22 has a downwardly projected edge portion. The position of this downwardly angled extremity of arm 22 is such that it is in the direct path of the projected end of each riffle plate as it moves past the lip 20. Thus as each riffle plate passes the lip 20 of tray or tank 4, the angled extremity of arm 22 in its path engages its leading surface and pulls down over its projected edge. Each plate 23 is thereby wiped clean under the biased wiping pressure thus applied by the arm 22 as the riffle plate is passed thereby. In this way it is insured that all of the heavy material carried by the conveyor plates 23 to the point of discharge is wiped therefrom and at a point where it is clear of and actually discharged from the tray.

The semi or partially clarified liquid surrounding the pump 16 which is above that at the bottom of the tray wherein the heavy material seeks to lie is drawn by said pump and moved through a pipe or conduit 24 into a manifold 25 extending longitudinally of the clarifier unit near the upper limits thereof. Liquid is supplied thereby to an integrated secondary clarification system.

A plurality of centrifugal cleaners 26, of the type shown in U.S. Pat. to Samson et al No. 2,377,524, are supported within the frame unit to have their tangential liquid inlets interconnected with the manifold 25 by suitable couplings 27. The liquid entering these cleaners or separators is divided by the operation thereof into two fractions, a dirt-rich or metal heavy fraction and a dirt-poor fraction which is cleaned liquid coolant. The "dirt-rich" fraction, which is a concentration of light and fine solids, is discharged from the apex end of the conical cleaner while the "dirt-poor" fraction is discharged from the base or upper end of the cleaner. The dirt-rich fraction discharged from the apex of the cleaners contains in concentrated form the remaining small and light pieces or particles of solid material within the contaminated liquid delivered to tray 4 which did not fall in the first instance and which were not carried to and from the bottom of the tray by riffle plates 23, while the clarified or cleaned liquid is discharged from the base end of the cleaners containing substantially no solid contaminant material and such can be immediately directed for reuse.

The clarified liquid is discharged from the separators 26 through connections 28 into a manifold 29 from where it is returned under pressure to a supply reservoir or place of use through outlet 30. The dirt-rich fractions of the liquid delivered to the separators 26 are discharged from the apex end of the cleaners into a trough or manifold 31 located on the opposite side of the tank 4 from the inlet trough 5 and similarly extended a substantial portion of the tray length. The discharge from the cleaners, which normally is ejected in the form of a spray, is confined within an extension 32 so as to be directed into the trough 31 without loss of liquid, from whence it falls, again, in spread fashion as the inflow of contaminated material from trough 5, back to the tray 4. Thus, there is produced a concentration of the extracted fines in the dirt-rich fraction discharged from the cleaners or separators 26 which is returned to the same main single pool of incoming contaminated or material laden liquid in the tank 4 for further treatment and separation of the solid material therefrom as described.

Accordingly, the present clarifier includes centrifugal cleaners or separators combined with moving riffle plates in a manner which provides continuous drag-out of the waste solid material from the liquid continuously delivered to tray 4, resulting in optimum clarification of the liquid without use of a filter cloth or paper of any kind. Thus a "no cloth" clarifier has been provided as a complete package ready for immediate installation, requiring only the connection of electrical power and the system for discharge of the contaminant material laden liquid thereto. The dirty liquid flows into the settling tank from its side to quickly spread with a minimal of turbulence, inherent in the form of the feed, and in the course of quickly and relatively easily settling on entry the heavy solids content is continuously moved from tray 4 while the lighter solids and liquid carrier above the layer containing the larger and heavier solids being evacuated by the riffle plates is pumped through the centrifugal separators. As a result there is discharged from the base of the separators clarified liquid. The underflow or dirt-rich fraction of the inflow to the separators is discharged from the apex portions thereof to return to the settling tank in a form wherein the lighter solids are concentrated. With the concentration of solids so produced, these solids now tend to fall to the bottom of the tray, mingling with the incoming heavy solids, and the riffle plates drag all of the settling solids out of the tank as a semi-dry sludge and discharge it into a container or conveyor. There is no necessity for manual cleaning of any filters or of the settling tank. This is all part of the automatic cleaning system here provided.

As noted, the application of the invention is not limited and the benefits and advantages in all similar applications should be obvious to those versed in the art.

In summary, it is seen that here is required only a single unpartitioned tray, with a minimal of interior material moving structure, into which all contaminated liquid is laterally introduced and caused to fall and spread, relatively fast and smoothly, from side to side and end to end thereof, minimizing turbulence in the pool so formed. The quick dispersement of the infeed and particularly its contaminants is facilitated by this generally central and longitudinally extended side feed. By reason of this it has been found that not only do solids settle relatively easily but such contaminants will not mass in limited areas so as to produce an uneven or concentrated load on the riffle plates 23 as could be the case, particularly where the infeed would be to one end of the tank or tray 4. Note, moreover, that the contaminants rejected by the cleaners 26 are similarly side fed to blend and disperse with solids in the infeed at the opposite side of the tank or tray 4.

In relation to the single and undivided pool created on the infeed of contaminated liquid there is a continuous and simultaneous operation on its contents by the riffle plates 23 and centrifugal cleaners, the latter being assisted by a suction pump the efficiency of which is emphasized by a position remote from both the areas of infeed and final solids discharge. And all the components are mounted so as to be integrated to and with the tank or tray 4. The net result is a simple, economical and most effective operation, apparatus relatively free of maintenance, and optimal results.

It has been found that embodiments of the present invention such as here described are capable of separating swarf and other solids, even finer than five microns in size, from water, water soluble and synthetic coolants and even light viscosity cutting oils. Note that the integrated installation of the invention requires no filter paper or cartridges and no magnets when applied to metal.

From the above description it will be apparent that there is thus provided a unit of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

This application is a direct continuation of our previous applications, respectively Ser. No. 791,382 filed Jan. 15, 1969 and 4,695 filed Jan. 21, 1970, the former of which has been abandoned in favor of the latter and the latter of which is now co-pending.

Having thus described our invention, we claim:

1. A liquid clarification unit for separating foreign materials from a liquid carrier including a tank-like receptacle constructed to define a pool of said liquid carrier, means for laterally flowing said carrier into one side of said receptacle to disperse the same from said one side to the other, to spread and provide for a quick settling of the heavier of said materials, means for simultaneously concentrating and in the course of concentrating removing the heaviest of the foreign materials in said carrier from said pool, and additional means for simultaneously drawing from said pool and concentrating lighter of the foreign materials in said carrier and returning the concentrated lighter materials directly to the same said pool to join therein and be discharged with the heaviest of said foreign materials by said removing means, said tank-like receptacle providing to one end thereof an area for intermingling and common discharge of the heaviest and the concentrated lighter materials and said additional means including a pumping device displaced from the area of said common discharge and the said removal means.

2. Apparatus as in claim 1 characterized by said pumping device being disposed at the opposite end of said tank, remote and displaced from both said common discharge area and the said removal means.

3. Apparatus as set forth in claim 1 characterized by said removal means for the heaviest of said foreign materials being arranged to bridge said receptacle and move from one end to the other thereof.

4. Apparatus as in claim 1 characterized by said removal means being conveyor mounted to move through said pool and to its bottom in an area clear of said pump to a point of discharge defined by said common discharge area.

5. Apparatus as in claim 4 characterized by said bottom of said pool being defined by the tank bottom to one end of which is provided an upwardly inclined surface portion the projected extremity of which terminates at said common discharge area and there being means beyond said projected extremity arranged to engage and clear said removal means in the course of advance thereof beyond said projected extremity of the upwardly inclined surface portion of said tank.

6. A liquid clarification unit for separating foreign materials from a liquid carrier including an elongated enclosure defining a receptacle for receiving a liquid carrier containing foreign materials to form therein a single pool, means for a lateral inflow of said liquid carrier to disperse the same from side to side of said receptacle, means for continuously concentrating and removing the heaviest of the foreign materials in said carrier from said pool, said second mentioned means including a continuous conveyor arranged to move through said pool in a longitudinal sense and in close proximity to the bottom of said enclosure to progressively discharge the heaviest and concentrated material therefrom in a continuing flow, additional means for removing the lighter of the foreign materials in the liquid carrier from said pool and separately concentrating the same, said last named means including a pump having inlet means within said enclosure and displaced from said conveyor, and means to return to the same said pool the concentrated lighter materials for discharge by the same said conveyor means.

7. A liquid clarification unit for separating foreign materials from a liquid carrier including a tank-like receptacle constructed to define a pool of said liquid carrier, means for laterally flowing said carrier into one side of said receptacle to disperse the same from said one side to the other, to spread and provide for a quick settling of the heavier of said materials, means for simultaneously concentrating and in the course of concentrating removing the heaviest of the foreign materials in said carrier from said pool, and additional means for simultaneously drawing from said pool and concentrating lighter of the foreign materials in said carrier and returning the concentrated lighter materials directly to the same said pool to join therein and be discharged with the heaviest of said foreign materials by said removing means, said pool being a continuously circulating body received in a tank providing therefor an elongated enclosure, said removal means being a continuous conveyor including projected plates arranged to move through said pool in close proximity to its bottom to progressively discharge from said pool and said tank the heavy and concentrated foreign material in a continuing flow, said additional means including a pump having inlet means open to said pool in an area displaced from said conveyor means.

8. Apparatus as set forth in claim 7 characterized by said conveyor means being arranged to transversely bridge and move from end to end of said pool.

9. Apparatus as set forth in claim 7 characterized by said tank bottom including a first inclined portion defining a drainage and discharge surface remote from said pump over which the foreign material is directed to discharge, in the process of which said surface provides means to convert the material to a semi-dry sludge.

10. Apparatus as in claim 7 characterized by said tank including, to one end of its bottom remote from said pump, means defining an inclined portion providing a drainage and discharge surface over which foreign material is directed to discharge and, to the opposite end, means defining a second inclined portion arranged to protect said pump from heavy foreign particles.

11. A liquid clarification unit for separating foreign materials from a liquid carrier including a tank-like receptacle constructed to define a pool of said liquid carrier, means for flowing said carrier into a side of said receptacle to disperse and spread the same from side to side whereby to provide for quick settling of the heavier of the foreign materials, means for concentrating and in the course of concentrating removing the heaviest of the foreign materials from said pool, additional means for simultaneously drawing lighter of the foreign materials from said pool and concentrating and discharging the same in concentrated form into the same said pool for discharge with the said heavier of the foreign materials, said receptacle providing, to one end thereof, an area for intermingling and common discharge of the heaviest and the concentrated lighter materials, said additional means including a pumping device displaced from the area of said common discharge and the said removal means, and a plurality of centrifugal separators having in connection therewith said pumping device in the form of a pump displaced from the area of said removing means, said pump including means defining an inlet for drawing liquid carrier from said pool which includes lighter foreign materials and said separators providing for the separation thereof into dirt-rich and dirt-poor fractions and being arranged to discharge the dirt-rich fractions containing the lighter foreign materials in concentrated form from adjacent one end thereof directly to said pool and the dirt-poor portion consisting of clarified liquid from another end portion thereof, and there being separate means for collecting the respective concentrated light foreign materials and the clarified liquid.

12. The unit as set forth in claim 11 characterized by said separate collection means including a manifold connected to said one or more centrifugal separators for collection of the clarified liquid for discharge from the unit and other means for directing the discharge of the concentrated light materials to influence them to be dispersed and carried to mingle with the concentrated heavy material to the bottom of said tank.

13. A liquid clarification unit for separating foreign materials from a liquid carrier including a tank-like receptacle constructed to define a pool of said liquid carrier, means for flowing said carrier into a side of said receptacle to disperse and spread the same from side to side whereby to provide for quick settling of the heavier of the foreign materials, means for concentrating and in the course of concentrating removing the heaviest of the foreign materials from said pool, additional means for simultaneously drawing lighter of the foreign materials from said pool and concentrating and discharging the same in concentrated form into the same said pool for discharge with the said heavier of the foreign materials, said receptacle providing, to one end thereof, an area for intermingling and common discharge of the heaviest and the concentrated lighter materials, said additional means including a pumping device displaced from the area of said common discharge and the said removal means, said pool being contained in an elongate enclosure providing a tank-like structure having at one side thereof means providing for an inflow to said tank structure of foreign materials in a liquid carrier, said additional means including said pumping device in the form of a suction device having means defining an inlet thereto in connection with said tank at one end and centrifugal cleaner means mounted in connection with said enclosure and in receiving relation to said suction device, said cleaner means being arranged to provide for discharge of clarified liquid from the base end thereof to a point clear of said tank and said lighter foreign materials from the opposite end thereof, in concentrated form, said cleaner means being so arranged as to discharge the concentrated lighter materials to the said pool.

* * * * *